United States Patent
Hishinuma et al.

(10) Patent No.: US 11,498,788 B2
(45) Date of Patent: Nov. 15, 2022

(54) SHEET CONVEYANCE APPARATUS, DOCUMENT READING APPARATUS AND IMAGE FORMING APPARATUS

(71) Applicant: CANON KABUSHIKI KAISHA, Tokyo (JP)

(72) Inventors: Norikazu Hishinuma, Kashiwa (JP); Masahito Ikeda, Koshigaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/891,253

(22) Filed: Jun. 3, 2020

(65) Prior Publication Data
US 2020/0385226 A1 Dec. 10, 2020

(30) Foreign Application Priority Data

Jun. 5, 2019 (JP) .............................. JP2019-105234
Jun. 5, 2019 (JP) .............................. JP2019-105236

(51) Int. Cl.
*B65H 7/14* (2006.01)
*B65H 7/20* (2006.01)
(Continued)

(52) U.S. Cl.
CPC ................. *B65H 7/14* (2013.01); *B65H 7/20* (2013.01); *G03G 15/6564* (2013.01);
(Continued)

(58) Field of Classification Search
CPC ... B65H 7/14; B65H 7/18; B65H 7/20; B65H 2511/12; B65H 2553/822; H04N 1/00652
See application file for complete search history.

(56) References Cited

U.S. PATENT DOCUMENTS 7,832,726 B2   11/2010   Osakabe
8,693,072 B2 *  4/2014   Osakabe ............ H04N 1/00652
                                                         358/498
(Continued)

FOREIGN PATENT DOCUMENTS

CN     102476504 A    5/2012
JP    2000-264445 A   9/2000
(Continued)

OTHER PUBLICATIONS

Chinese Office Action dated Nov. 29, 2021, in related Chinese Patent Application No. 202010487374.6 (with English translation).

*Primary Examiner* — Howard J Sanders
(74) *Attorney, Agent, or Firm* — Venable LLP

(57) ABSTRACT

A sheet conveyance apparatus includes a sheet supporting tray to support a sheet, a sheet conveyance unit to convey the sheet supported on the sheet supporting tray, a first detection sensor to detect the supported sheet at a first detection position, and a second detection sensor to detect the supported sheet at a second detection position farther from a center of the sheet supporting tray in a sheet width direction than the first detection position. In addition, a control unit controls the sheet conveyance unit in a first mode in a case where the first and second detection sensors detect the sheet, and controls the sheet conveyance unit in a second mode in which a sheet conveyance speed is slower than that of the first mode in a case where the first detection sensor detects the sheet and the second detection sensor detects no sheet.

11 Claims, 15 Drawing Sheets

(51) Int. Cl.
*H04N 1/00* (2006.01)
*G03G 15/00* (2006.01)

(52) U.S. Cl.
CPC ....... *G03G 15/6567* (2013.01); *H04N 1/0066* (2013.01); *H04N 1/00652* (2013.01); *B65H 2511/12* (2013.01); *B65H 2511/182* (2013.01); *B65H 2513/106* (2013.01)

(56) References Cited

U.S. PATENT DOCUMENTS

| | | | |
|---|---|---|---|
| 8,950,749 B2 * | 2/2015 | Maeda | B65H 7/20 271/270 |
| 9,004,671 B2 | 4/2015 | Sakano | |
| 9,036,165 B2 | 5/2015 | Osakabe et al. | |
| 2009/0166953 A1 * | 7/2009 | Osakabe | B65H 7/02 271/18 |
| 2014/0355083 A1 * | 12/2014 | Omoya | B65H 1/04 271/226 |
| 2020/0310320 A1 * | 10/2020 | Nakata | H04N 1/00795 |

FOREIGN PATENT DOCUMENTS

| | | |
|---|---|---|
| JP | 2008-175912 A | 7/2008 |
| JP | 2009-161261 A | 7/2009 |
| JP | 2010-063003 A | 3/2010 |
| JP | 2013-014391 A | 1/2013 |

\* cited by examiner

SHEET CONVEYANCE APPARATUS, DOCUMENT READING APPARATUS AND IMAGE FORMING APPARATUS

BACKGROUND OF THE INVENTION

Field of the Invention

The present invention relates to a sheet conveyance apparatus configured to convey a sheet placed on a sheet supporting unit and to a document reading apparatus as well as to an image forming apparatus.

Description of the Related Art

Some image forming apparatuses such as a copier and a multi-function printer include an automatic document feeder (referred to as an "ADF" hereinafter) configured to convey a document, i.e., a sheet, to an image reading unit. Such ADF is apt to cause jamming or multi-feed in a case where the document is a small-sized document such as a name card and a check having weak stiffness as compared to a large-sized document. In contrary, if the stiffness is high, a conveyance load of the ADF tends to become high. Therefore, in order to protect the document, to prevent the multi-feed, to prevent deficiency of the conveyance speed with respect to a reading speed and the like, it is necessary to change conveyance control by changing the conveyance speed depending on a size of the document for example.

While size information of a document may be obtained through an input operation of a user, there is a case where no size information is inputted or inputted size information does not match with an actual document size. Then, because it is unable to select an appropriate conveyance control in such a case, it is desirable to detect the document size. To that end, Japanese Patent Application Laid-open No. 2000-264445 has proposed an apparatus that determines a document size to change a feed speed of the document by determining positions of side regulating plates, i.e., sheet feed guides, that regulate widthwise positions of the document by two sensors.

However, in order to detect the positions of the side regulating plates by the sensors as described in Japanese Patent Application Laid-open No. 2000-264445, it is necessary to provide members and sensors interlocked with the side regulating plates within a document tray in which the side regulating plates are provided. While the document tray in the ADF is provided pivotably in particular in order to be able to readily take out a discharged document, it is complicated to route wires within the document tray, thus obstructing reduction of costs.

SUMMARY OF THE INVENTION

According to one aspect of the present invention, a sheet conveyance apparatus includes an apparatus body, a sheet supporting unit including a sheet supporting tray pivotably supported with respect to the apparatus body and configured to support a sheet, a sheet conveyance unit configured to convey the sheet placed on the sheet supporting unit, a width regulating unit configured to regulate and position the sheet placed on the sheet supporting unit within a widthwise first range and within a widthwise second range including the widthwise first range, a first detection sensor disposed within the widthwise first range in the apparatus body and configured to detect whether the sheet placed on the sheet supporting unit is present, a second detection sensor disposed without the widthwise first range and within the widthwise second range in the apparatus body and configured to detect whether the sheet placed on the sheet supporting unit is present, and a control unit configured to determine that the sheet is of a first size in a case where the first and second detection sensors detect that the sheet is present and determines that the sheet is of a second size smaller than the first size in a case where the first detection sensor detects that the sheet is present and the second detection sensor detects no sheet. The control unit controls the sheet conveyance unit in a first mode in a case where the control unit determines that the sheet is of the first size and controls the sheet conveyance unit in a second mode in which a sheet conveyance speed is slower than that of the first mode in a case where the control unit determines that the sheet is of the second size.

Further features of the present invention will become apparent from the following description of exemplary embodiments with reference to the attached drawings.

DESCRIPTION OF THE EMBODIMENTS

First Embodiment

Overall Configuration

Figure 1:
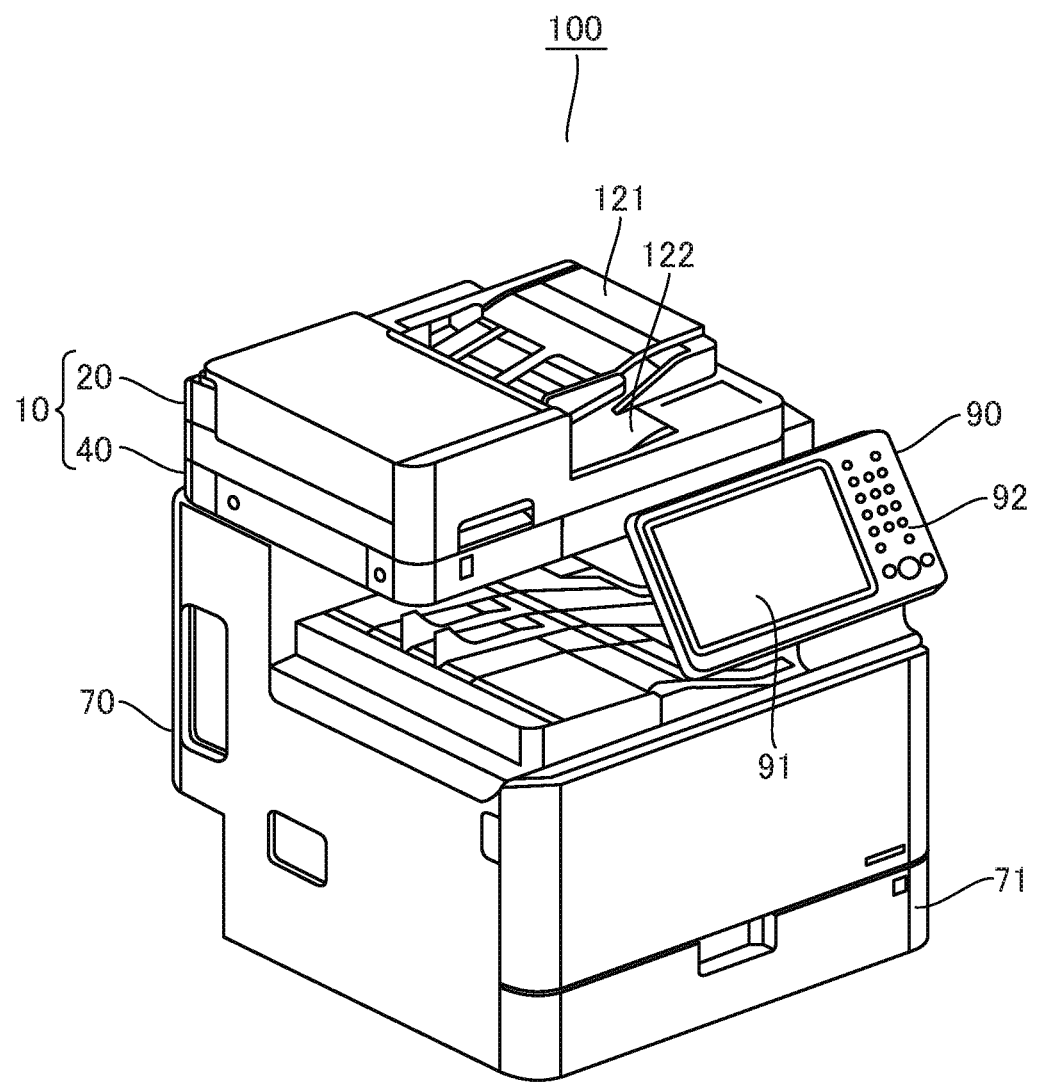
FIG. 1 is a perspective view illustrating an overall configuration of a printer of a first embodiment.
Figure 2A:
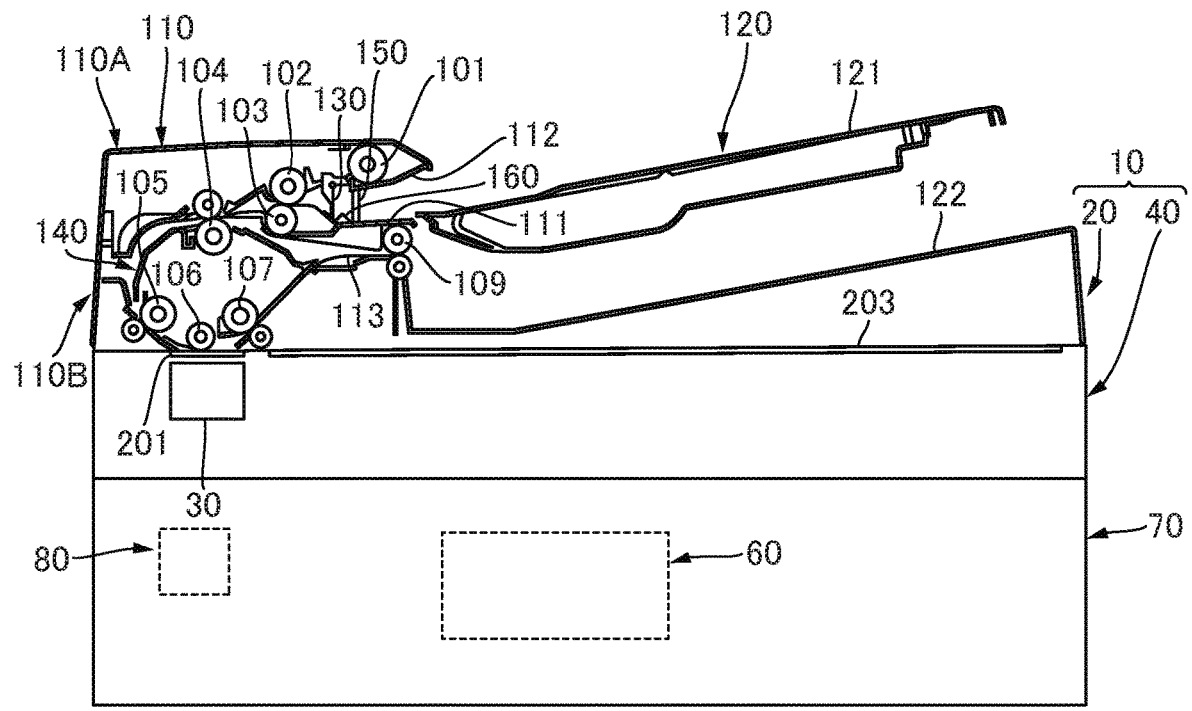
FIG. 2A is a section view schematically illustrating the printer of the first embodiment.
Figure 2B:
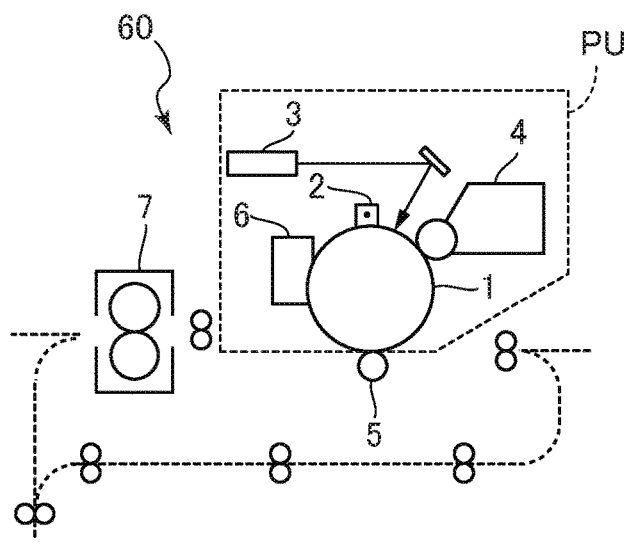
FIG. 2B is a schematic diagram illustrating an image forming engine.

A first embodiment of the present disclosure will be described below with reference to the drawings. A printer 100 serving as an image forming apparatus of the present embodiment is an electro-photographic laser beam printer. As illustrated in FIG. 1, the printer 100 includes a printer body 70, a document reading apparatus 10 mounted on a top of the printer body 70 and an operating portion 90 having a display portion 91 and operation keys 92. As illustrated in FIGS. 1, 2A and 2B, the printer body 70 includes an image forming engine 60, a control portion 80 configured to control the printer 100 and the document reading apparatus 10 and a cassette 71 configured to store a sheet to be fed to the image forming engine 60. Note that the sheet in the following description includes, besides a plain sheet of paper, a special sheet such as a thick sheet and a coated sheet, a recording material having a special shape such as an envelope and an index sheet, a plastic film for an overhead projector and a cloth. A document is one example of the sheet.

As illustrated in FIG. 2B, the image forming engine 60 serving as an image forming unit includes an electro-photographic image forming unit PU and a fixing unit 7. As an instruction of starting an image forming operation is given, a photosensitive drum 1 serving as a photosensitive member rotates and a surface of the drum is homogeneously charged by a charging unit 2. Then, an exposing unit 3 outputs a laser beam modulated based on image data transmitted from an image reading apparatus 30 or an external computer to scan the surface of the photosensitive drum 1 to form an electrostatic latent image. This electrostatic latent image is visualized, i.e., is developed as a toner image, by toner supplied from a developing unit 4.

In parallel with such image forming operation, a feed operation of feeding the sheet placed in the cassette 71 or in a manual feed tray not illustrated to the image forming engine 60 is executed. The sheet being fed is conveyed in synchronism with an advance of the image forming operation conducted by the image forming unit PU. Then, the toner image borne on the photosensitive drum 1 is transferred onto the sheet by a transfer roller 5. Toner left on the photosensitive drum 1 after the transfer of the toner image is collected by a cleaning unit 6. The sheet onto which the non-fixed toner image has been transferred is delivered to the fixing unit 7 to be nipped by a roller pair, i.e., to be heated to melt the toner image and to be pressed to adhere the toner image onto the sheet. The sheet onto which the toner image has been thus fixed is discharged by a discharging unit such as a sheet discharge roller pair.

Image Reading Apparatus

Next, the document reading apparatus 10 will be described in detail. As illustrated in FIG. 2A, the document reading apparatus 10 includes an ADF (automatic document feeder) 20 configured to feed a document placed on a document tray 121 serving as a sheet supporting tray and to discharge the document to a discharge tray 122 and a reading unit 40 configured to read the document being conveyed by the ADF 20. That is, the ADF 40 constitutes a sheet conveyance apparatus configured to convey a sheet, i.e., a document, to the reading unit 40. The reading unit 40 constitutes an image reading unit having an image reading apparatus 30 configured to read an image on a surface of the document. The document tray 121 also constitutes a sheet supporting portion 120 serving as a sheet supporting unit configured to support the document, i.e., the sheet, together with a feed lower guide 111 in the apparatus body 110 of the ADF 20. Note that the ADF 20 is supported pivotably with respect to the reading unit 40 by a hinge such that a document stage glass 203 is openable. Still further, the document which is one example of the sheet may be a blank sheet or may be what an image is formed on one side or both sides thereof.

Figure 4:
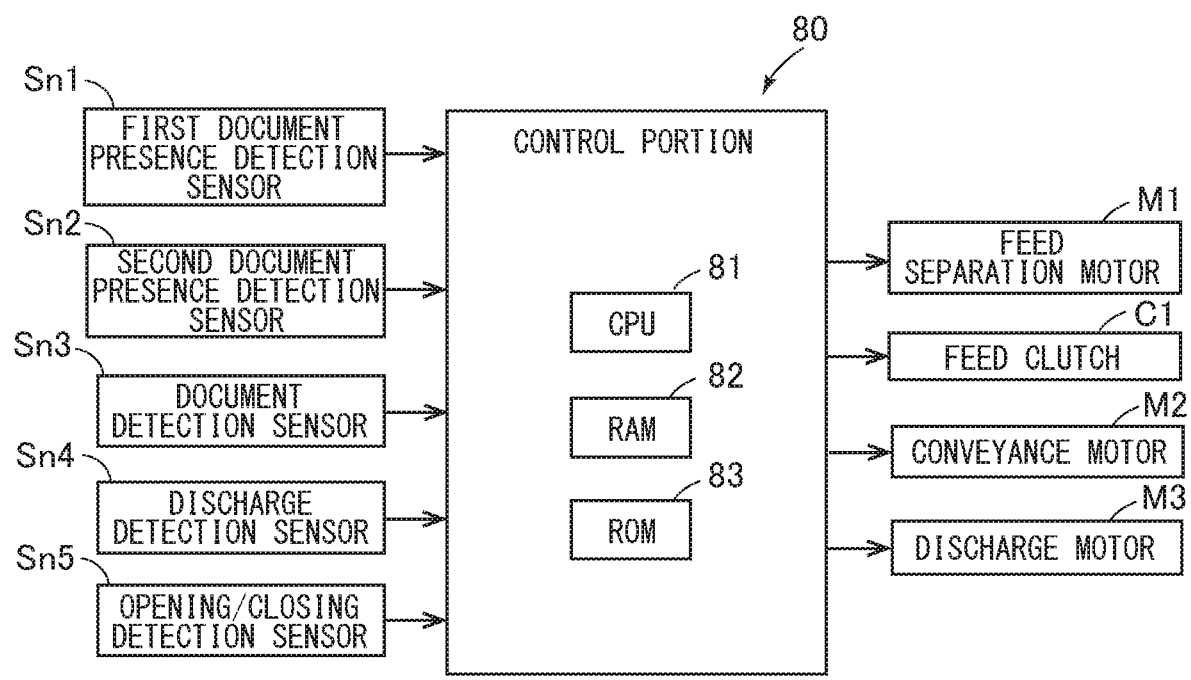
FIG. 4 is a block diagram illustrating a control portion and sensors and various motors connected to the control portion of the first embodiment.

The ADF 20 includes, as a sheet conveyance unit, a pickup roller 101 serving as a rotary feed member, a separation driving roller 102 and a retard roller 103 constituting a separation roller pair and a registration roller pair 104. The ADF 20 further includes, as the sheet conveyance unit, conveyance roller pairs 105 and 107, a lead roller 106 and a discharge roller pair 109. The ADF 20 also includes a first document presence detection sensor Sn1, a second document presence detection sensor Sn2, a document detection sensor Sn3, a discharge detection sensor Sn4, an opening/closing detection sensor Sn5 and others as illustrated in FIG. 4 and as described later in detail. The ADF 20 further includes a feed and separation motor M1, a feed clutch C1, a conveyance motor M2, a discharge motor M3 and others. Meanwhile, the reading unit 40 includes a platen glass 201, a document stage glass 203 and the image reading apparatus 30.

Figure 5:
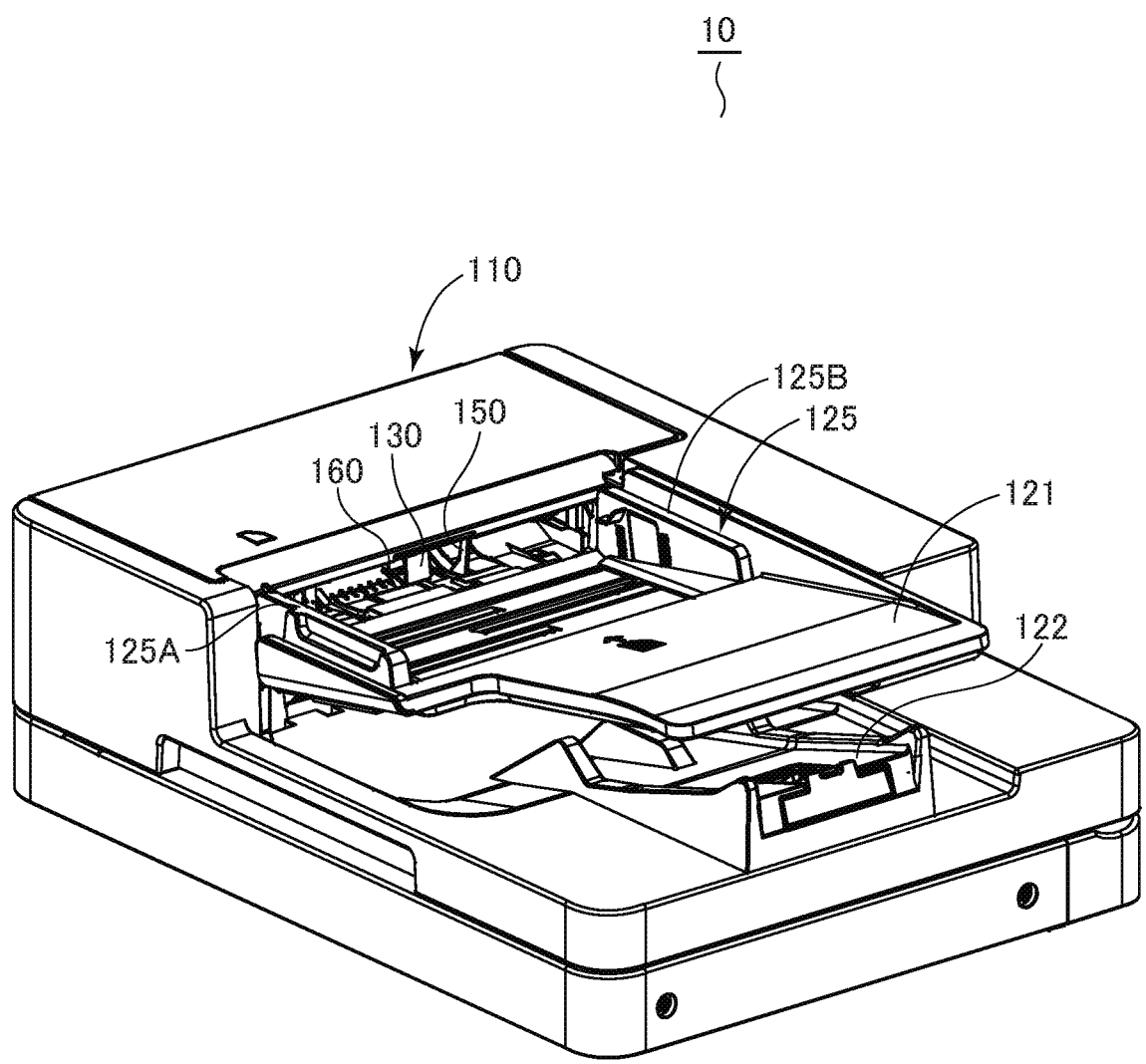
FIG. 5 is a perspective view illustrating an overall configuration of the ADF of the first embodiment.

As illustrated in FIG. 5, the document tray 121 includes a side regulating unit 125 serving as a width regulating unit configured to be movable in a width direction on a document supporting surface and to regulate a widthwise position of the document by abutting with widthwise ends of the document. The side regulating unit 125 is composed of a pair of side regulating plates 125A and 125B movable in the width direction. These side regulating plates 125A and 125B are interlocked by a rack and pinion mechanism for example which is an interlock mechanism not illustrated and disposed within the document tray 121. Then, the side regulating plates 125A and 125B move in the width direction in an interlocked manner by moving either one of them. In the present embodiment, a document conveyance center line is located at a widthwise center and these side regulating plates 125A and 125B are arranged so as to come closer to or to separate away from the widthwise center. That is, the document tray 121 is arranged such that the document conveyance center is located at the same position regardless of sizes of documents.

Figure 3:
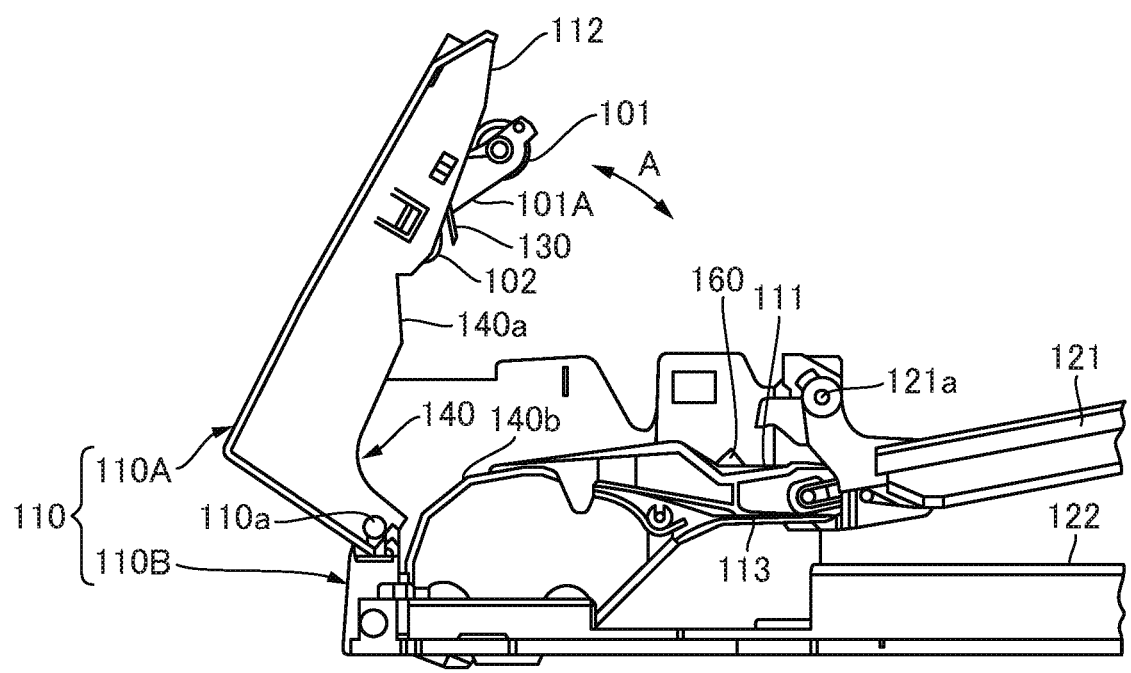
FIG. 3 is a section view illustrating a state in which a cover unit of an apparatus body of an ADF of the first embodiment is opened.

The ADF 20 also includes the apparatus body 110 having a body unit 110B and a cover unit 110A. As illustrated in FIG. 3, the cover unit 110A is configured to be pivotable with respect to the body unit 110B in a direction of an arrow A at a fulcrum of a spindle 110a. The ADF 20 includes a conveyance path 140 composed of a conveyance guide 140a provided in the cover unit 110A and a conveyance guide 140b provided in the body unit 110B and through which the document is conveyed by the respective rollers described above. That is, the conveyance path 140 is arranged such that the conveyance guide 140a is opened with respect to the conveyance guide 140b by turning the cover unit 110A to enable to remove a jammed document for example.

Meanwhile, the document tray 121 is attached to the body unit 110B of the apparatus body 110 so as to be pivotable upward at a fulcrum of a pivot shaft 121a. The document tray 121 is arranged such that a user can readily take out the document discharged onto the discharge tray 122 by manually pivoting the document tray 121. The feed lower guide 111 is provided in the body unit 110B so as to be linked with an extension of an upper surface of the discharge tray 122, and a feed upper guide 112 is provided in the cover unit 110A so as to face the feed lower guide 111. A feed slot for inserting a bundle of documents is formed by these feed lower and upper guides 111 and 112 as illustrated in FIG. 2A. Then, the feed lower guide 111 and the document tray 121 constitute the supporting surface for supporting the document.

Meanwhile, the cover unit 110A is provided with the pickup roller 101 disposed swingably by an arm 101A as illustrated in FIG. 3. The arm 101A is driven and lifted by a driving force of the feed and separation motor M1 transmitted to the pickup roller 101 through engagement of the feed clutch C1 and causes the pickup roller 101 to abut with an uppermost document in the bundle of documents. The arm 101A is provided, so as to be interlocked, with a lock mechanism that locks a regulating plate 130 serving as a downstream regulating member that abuts with a downstream end portion in a conveyance direction, i.e., a sheet conveyance direction, of the document. The lock mechanism locks the regulating plate 130 at a position regulating a leading edge of the document in a state in which the pickup roller 101 is lifted as illustrated in FIG. 2A. The lock mechanism also unlocks the regulating plate 130 to allow the document to pass in a state in which the pickup roller 101 is lowered. Then, as illustrated in FIGS. 2A and 5, a detection member 160 of the first document presence detection sensor Sn1 and a detection member 150 of the second document presence detection sensor Sn2 are arrayed widthwise upstream in a document feed direction of the regulating plate 130. These detection members 160 and 150 are also disposed downstream in the feed direction of the pickup roller 101, or more specifically, downstream in the feed direction of a position where the pickup roller 101 is lowered and abuts with the document.

Figure 6A:
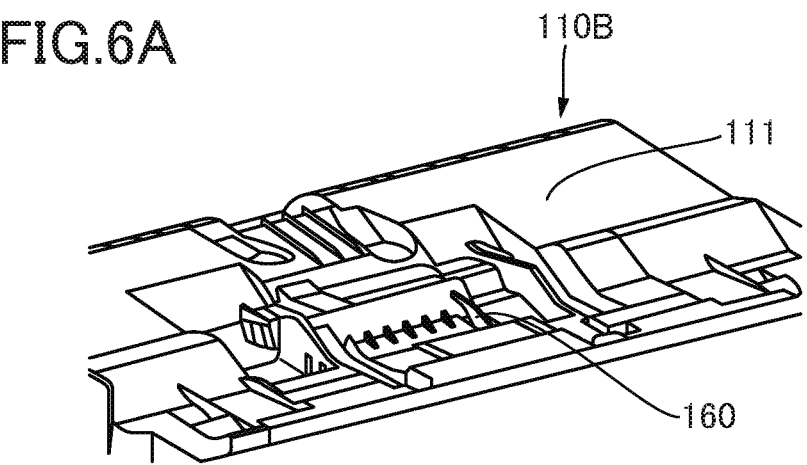
FIG. 6A is a perspective view illustrating a part of a feed lower guide of the ADF.
Figure 6B:
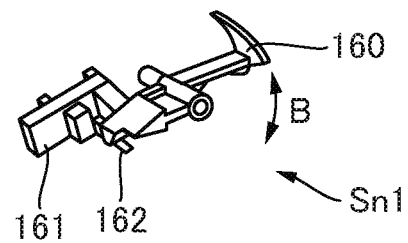
FIG. 6B is a perspective view illustrating a first document presence detection sensor.

As illustrated in FIG. 6A, the first document presence detection sensor Sn1 is disposed within the body unit 110B such that the detection member 160 projects out from the feed lower guide 111 to the document supporting surface. The first document presence detection sensor Sn1 includes a sensor body 161, the detection member 160 supported pivotably in a direction of an arrow B and a flag portion 162 pivoting in linkage with the pivot of the detection member 160 as illustrated in FIG. 6B. Then, as a document is placed on the feed lower guide 111 and the detection member 160 pivots, the flag portion 162 blocks a sensor light of the sensor body 161 and outputs an ON signal to the control portion 80. Thus, the control portion 80 detects that the document is present on the feed lower guide 111 or the document tray 121. Because the first document presence detection sensor Sn1 is disposed inside of the body unit 110B as described above, wires can be routed within the body unit 110B and it is unnecessary to route the wires in the document tray 121.

Figure 7A:
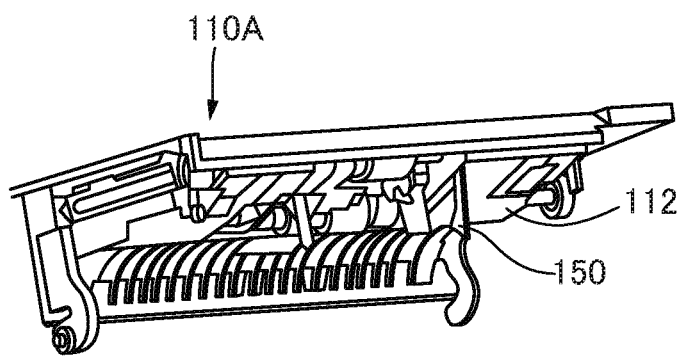
FIG. 7A is a perspective view illustrating a part of a feed upper guide of the ADF.
Figure 7B:
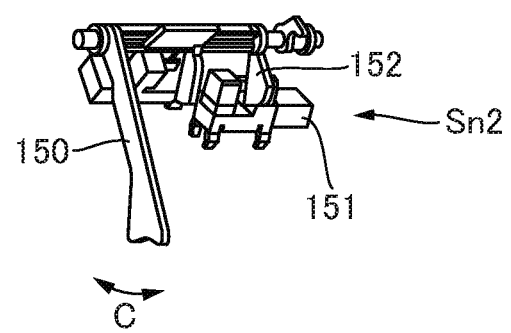
FIG. 7B is a perspective view illustrating a second document presence detection sensor.

As illustrated in FIG. 7A, the second document presence detection sensor Sn2 is disposed inside of the cover unit 110A such that the detection member 150 projects out of the feed upper guide 112. The second document presence detection sensor Sn2 includes a sensor body 151, the detection member 150 supported pivotably in a direction of an arrow C and a flag portion 152 that pivots in linkage with the pivot of the detection member 150 as illustrated in FIG. 7B. Then, when a document is placed on the feed lower guide 111 and the detection member 150 pivots, the flag portion 152 blocks a sensor light of the sensor body 151 and outputs an ON signal to the control portion 80. Thus, the control portion 80 detects that the document is present on the feed lower guide 111 or the document tray 121. Because the second document presence detection sensor Sn2 is disposed inside of the cover unit 110A as described above, wires can be routed within the cover unit 110A and it is unnecessary to route the wires in the document tray 121. Note that a positional relationship between the detection members 160 and 150 will be described later.

Next, a document reading operation will be described with reference to FIG. 2A. The document reading apparatus 10 reads image information from a document in a feeding-reading mode of scanning a document image while feeding the document placed on the document tray 121 by the ADF 20 or in a fixed-reading mode of scanning the document placed on the document stage glass 203. The feeding-reading mode is selected in a case where the first document presence detection sensor Sn1 detects the document placed on the document tray 121 or in a case where the user explicitly instructs through the operating panel or the like of the printer body 70.

When the feeding-reading mode is to be executed, the pickup roller 101 drops and abuts with an uppermost document on the document tray 121. Then, the document is fed by the pickup roller 101 and is separated one by one at a separation nip serving as a separation unit composed of the separation driving roller 102 and the retard roller 103. A torque limiter is disposed in a rotation supporting structure of the retard roller 103. Then, the retard roller 103 rotates following the separation driving roller 102 when one document is fed and does not rotate when two or more documents are fed. Thus, the document can be separated one by one. Note that a drive in a direction opposite to the sheet feed direction may be inputted to the retard roller 103.

Leading and trailing edges of the document that has passed through the separation nip are detected by a document detection sensor Sn3 (see FIG. 4) and serve as a base of an elevating timing of the pickup roller 101 or of drive starting and stopping timings thereof. The leading and trailing edges of the document that has passed through the separation nip and detected by the document detection sensor Sn3 (see FIG. 4) and serve also as a base of drive starting and stopping timings of the registration roller pair 104. Note that the pickup roller 101 and the separation driving roller 102 are connected with and driven by the feed and separation motor M1 (see FIG. 4) which is one and same driving source.

The leading edge of the document being conveyed butts against the registration roller pair 104 in a stop state to correct a skew of the document. The document whose skew has been corrected is conveyed by the registration roller pair 104 and is then conveyed by a conveyance roller pair 105 toward a platen glass 201. Disposed so as to face the platen glass 201 is a lead roller 106 that guides the document passing through the platen glass 201 so as not to float on the platen glass 201. Note that the registration roller pair 104 and the conveyance roller pairs 105 and 107 are connected with and driven by the conveyance motor M2 (see FIG. 4).

An image on a surface of the document is read by the image reading apparatus 30 through the platen glass 201. Image information photo-electrically converted by light-receiving elements of a line sensor not illustrated of the image reading apparatus 30 is transferred to the control portion 80 (see FIG. 4). Then, the document that has passed through the platen glass 201 is lead to the conveyance roller pair 107 to be discharged by a discharge roller pair 109 onto a discharge tray 122. Note that the discharge roller pair 109 is connected with and driven by the discharge motor M3 (see FIG. 4).

Meanwhile, the fixed-reading mode is selected in a case where the apparatus detects the document placed on the document stage glass 203 or in a case where the user explicitly instructs to read the document through the operating panel or the like of the printer body 70. In this case, the document on the document stage glass 203 does not move and the image reading apparatus 30 scans the document by moving along the document stage glass 203. Image information of the document photo-electrically converted by the light-receiving elements of the line sensor not illustrated of the image reading apparatus 30 is also transferred to the control portion 80 (see FIG. 4).

Control Portion

Next, a configuration of the control portion 80 serving as a control unit of the printer 100 and the ADF 20 will be described with reference to FIG. 4. As illustrated in FIG. 4, the control portion 80 includes a CPU 81, a RAM 82, a ROM 83 and others. The control portion 80 is connected respectively with the first document presence detection sensor Sn1, the second document presence detection sensor Sn2, the document detection sensor Sn3, the discharge detection sensor Sn4 and the opening/closing detection sensor Sn5 described above to receive signals from those sensors. The control portion 80 is also connected with the feed and separation motor M1, the feed clutch C1, the conveyance motor M2 and the discharge motor M3, respectively, and sets a document conveyance speed the respective roller pairs by controlling their driving speeds and transmission of drive to them. It is noted that the discharge detection sensor Sn4 is disposed such that a detection member not illustrated projects out to the discharge tray 122 to detect whether the document discharged to the discharge tray 122 is present. Still further, the opening/closing detection sensor Sn5 is disposed in the cover unit 110A or the body unit 110B to detect whether the cover unit 110A is opened with respect to the body unit 110B.

Figure 8A:
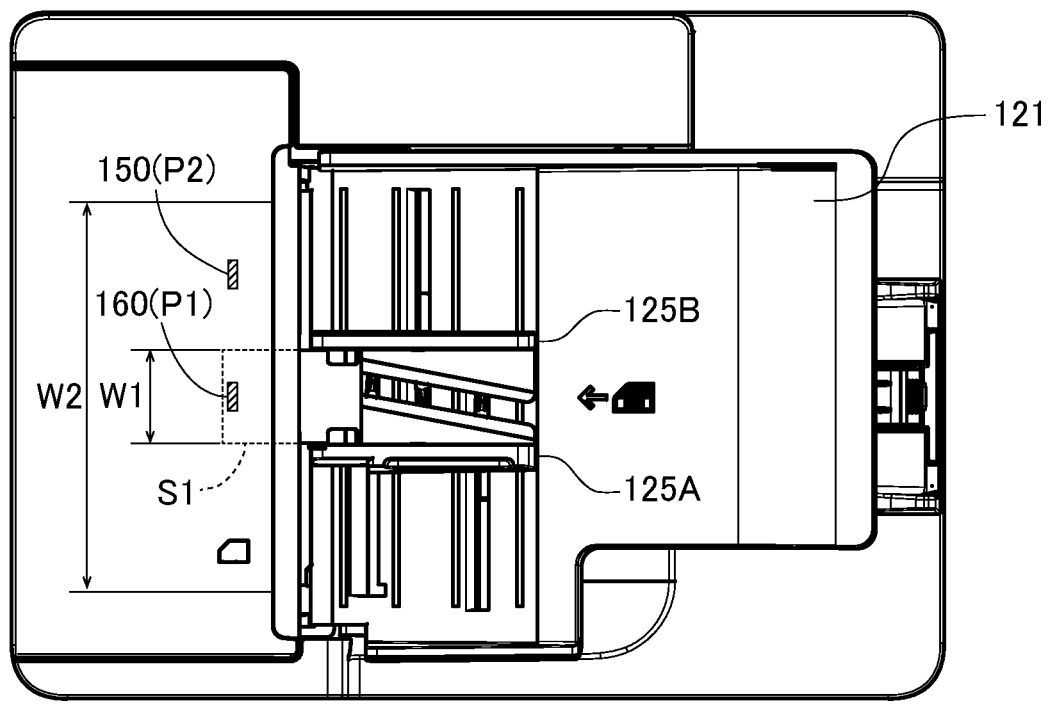
FIG. 8A is a top view illustrating the ADF in a state in which a small-sized document is set.
Figure 8B:
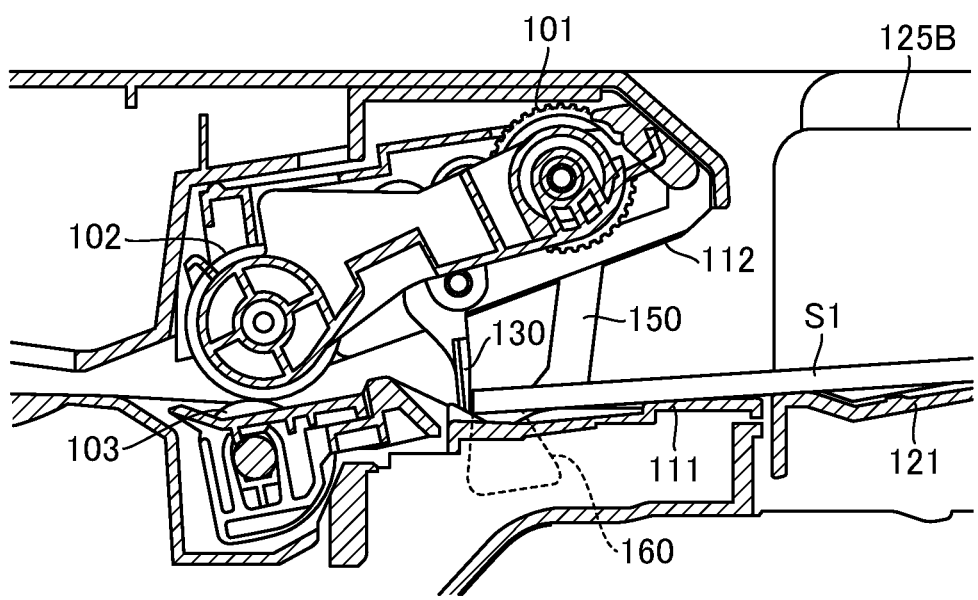
FIG. 8B is a section view illustrating the ADF in a state in which the small-sized document is set.

Positional Relationship Between First and Second Document Presence Detection Sensors Next, the positional relationship between the detection position P1 of the first document presence detection sensor Sn1 serving as a first detection sensor and a detection position P2 of the second document presence detection sensor Sn2 serving as a second detection sensor will be described. FIG. 8A is a top view illustrating the ADF in a state in which a small-sized document is set. The small-sized document refers to a sheet having a short width such as a name card in the present embodiment. For instance, sizes of a name card used in Japan are 55 mm×91 mm and sizes of a name card used in the US are 51 mm×89 mm or 49 mm×85 mm. When the user places a small-sized document, i.e., a second size document, S1 having small widths such as a name card on the document tray 121, the side regulating plates 125A and 125B regulate widthwise positions of the document S1 by abutting with both widthwise ends of the document S1. Then, the document S1 is set within a widthwise first range W1. The detection member 160 of the first document presence detection sensor Sn1 is disposed at the detection position P1 which is a widthwise center part, i.e., at a position closer to the widthwise center more than widthwise ends. That is, the detection member 160 is disposed within the first range W1. Due to that, when the document S1 is inserted toward downstream in the feed direction and is set so as to abut with the regulating plate 130 (see FIG. 5), the detection member 160 is pressed and pivots downward as illustrated in FIG. 8B. Thereby, the first document presence detection sensor Sn1 outputs an ON signal to the control portion 80, and the control portion 80 determines that the document S1 is present.

Figure 9A:
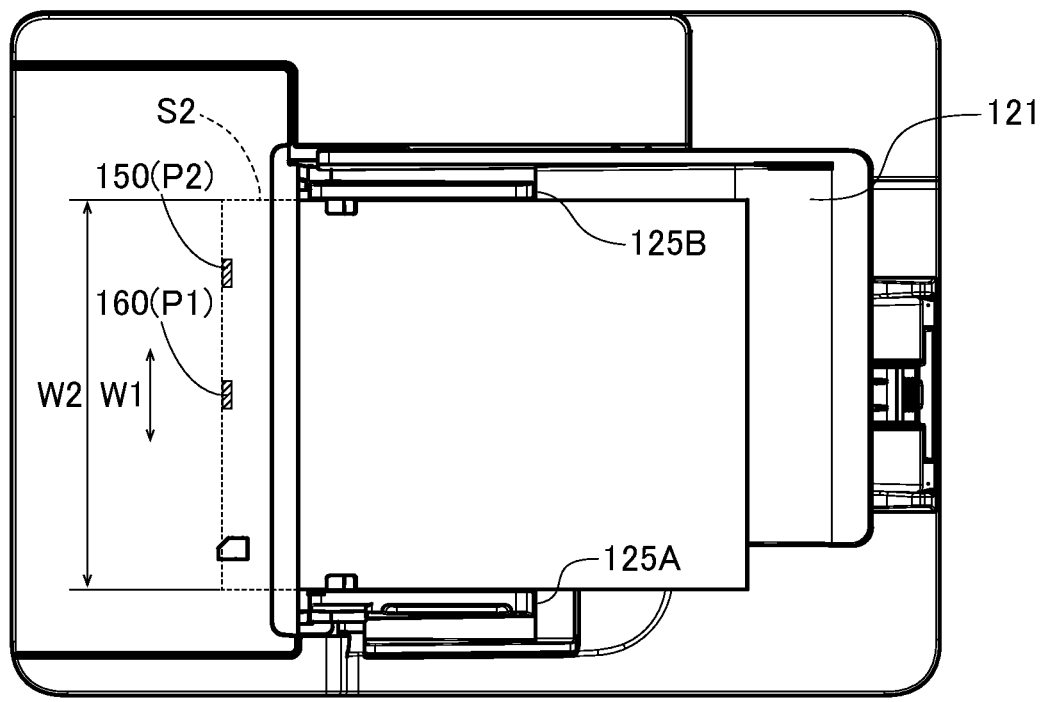
FIG. 9A is a top view illustrating the ADF in a state in which a large-sized document is set.
Figure 9B:
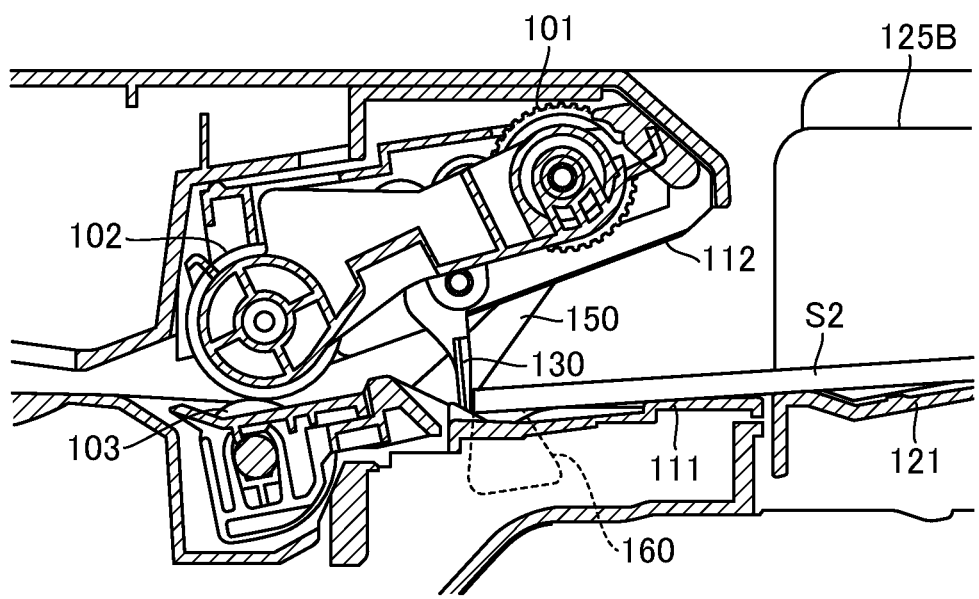
FIG. 9B is a section view illustrating the ADF in a state in which the large-sized document is set.

Meanwhile, when the user places a large-sized document, i.e., a first size document, S2 having a large width such as an A4 size sheet on the document tray 121, the side regulating plates 125A and 125B regulate widthwise positions of the document S2 by abutting with both widthwise ends of the document. Then, the document S2 is set within a widthwise second range W2. The detection member 160 of the first document presence detection sensor Sn1 is disposed at the detection position P1 located at the widthwise center part, i.e., the widthwise center side, as described above. The detection member 150 of the second document presence detection sensor Sn2 is disposed at the detection position P2 which is closer to the widthwise end more than the widthwise center part and which is located outside of the first range W1. That is, the detection member 150 is disposed outside of the first range W1 and inside of the second range W2. Therefore, when the document S2 is inserted toward downstream in the feed direction and is set so as to abut with the regulating plate 130 (see FIG. 5), the detection member 160 is pressed and pivots downward and the detection member 150 is pressed and pivots upward as illustrated in FIG. 9B. Thereby, the both of the first and second document presence detection sensors Sn1 and Sn2 output ON signals to the control portion 80, and the control portion 80 determines that the document S2 is present.

Document Feeding Process

Figure 10:
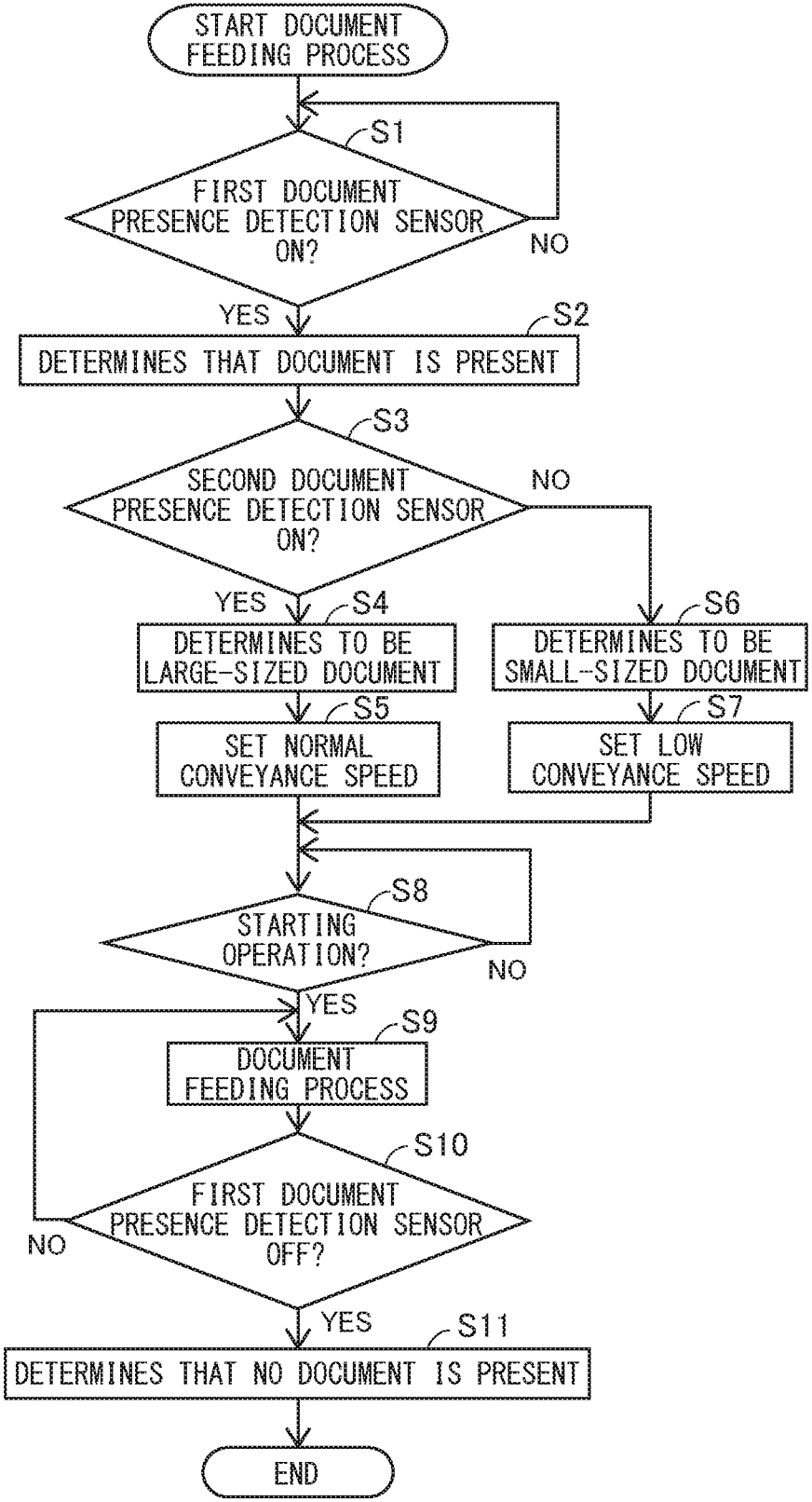
FIG. 10 is a flowchart illustrating a document feeding process of the first embodiment.

Next, a document feeding process executed by the control portion 80 will be described. As illustrated in FIG. 10, the first document presence detection sensor Sn1 is in a standby state while outputting an OFF signal until when the user sets a document on the document tray 121 for example, i.e., NO in Step S1. After that, as the user places a document on the document tray 121 and as the first document presence detection sensor Sn1 outputs an ON signal, i.e., YES in Step S1, the control portion 80 determines that the document is present in Step S2.

In succession, the control portion 80 determines whether the second document presence detection sensor Sn2 outputs an ON signal in Step S3. In a case where the second document presence detection sensor Sn2 outputs the ON signal, i.e., YES in Step S3, the process advances to Step S4. That is, in a case where both of the first and second document presence detection sensors Sn1 and Sn2 output the ON signals, the control portion 80 determines that the document is the document S2 as illustrated in FIG. 9A in Step S4. Then, the control portion 80 sets the first mode of setting a conveyance speed at a normal conveyance speed in Step S5. Specifically, in the first mode, the respective driving rollers of the pickup roller 101, the separation driving roller 102, the registration roller pair 104, the conveyance roller pairs 105 and 107 and the discharge roller pair 109 are set to be driven at the normal speed.

Meanwhile, in a case where the first document presence detection sensor Sn1 outputs the ON signal and the second document presence detection sensor Sn2 outputs an OFF signal, the control portion 80 determines that the document is the document S1 as illustrated in FIG. 8A in Step S6. Then, because the document is highly possible to be a document having weak stiffness, the control portion 80 sets the second mode by which the conveyance speed is set at a low conveyance speed which is slower than the normal conveyance speed in Step S7. Specifically, in the second mode, the respective driving rollers of the pickup roller 101, the separation driving roller 102, the registration roller pair 104, the conveyance roller pairs 105 and 107 and the discharge roller pair 109 are set to be driven at the low speed which is slower than the normal speed.

After that, the control portion 80 is kept in a state of waiting for receiving a start operation that instructs to start a reading operation through the operation key 92 of the operating portion 90, i.e., NO in Step S8. As the control portion 80 receives the start operation i.e., YES in Step S8, the control portion 80 executes the document feeding process of feeding the document to the image reading apparatus 30 at the conveyance speed set as described above in Step S9. Thus, the image of the document is read, and the document is discharged to the discharge tray 122. In succession, the control portion 80 determines whether the first document presence detection sensor Sn1 outputs the OFF signal in Step S10, and if the signal is not the OFF signal, i.e., NO in Step S10 and the document is still present on the document tray 121, the control portion 80 executes the document feeding process of the next document. Then, when the first document presence detection sensor Sn1 outputs the OFF signal, i.e., YES in Step S10 and there is no document on the document tray 121, the control portion 80 determines that no document is present in Step S11 and ends the document feeding process.

As described above, according to the document reading apparatus 10 of the present embodiment, it is possible to determine sizes of documents by disposing the first and second document presence detection sensors Sn1 and Sn2 in the apparatus body 110. Still further, it is not necessary to route wires within the document tray 121, so that costs can be reduced. Still further, even though the first document presence detection sensor Sn1 is a sensor detecting presence of a document on the document tray 121, it is utilized also as a sensor detecting sizes of documents. That is, this arrangement makes it possible to require no sensor dedicated for detecting sizes of documents and hence to reduce the costs.

Second Embodiment

Next, a second embodiment will be described. While the first and second document presence detection sensors Sn1 and Sn2 detect the document at the same position in terms of the document feed direction in the first embodiment described above, document a detection position of the first document presence detection sensor Sn1 is different from that of the second document presence detection sensor Sn2 in terms of the document feed direction in the present embodiment. Then, only points different from the first embodiment will be described below and description of other parts will be omitted here.

Figure 11A:
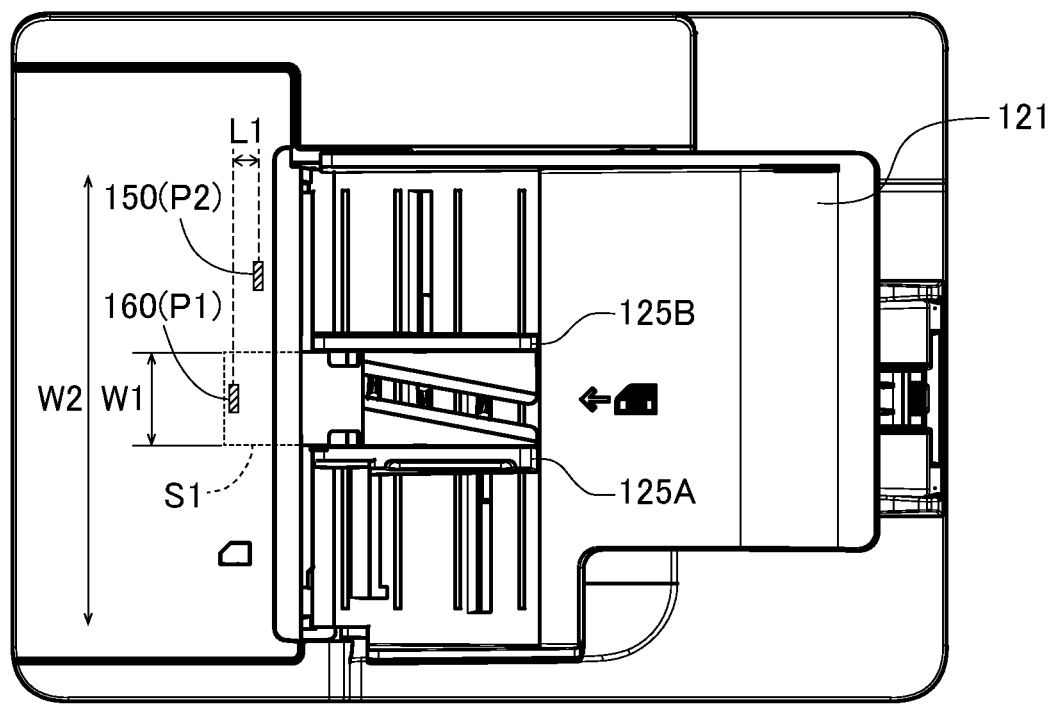
FIG. 11A is a top view illustrating an ADF of a second embodiment in a state in which a small-sized document is set.
Figure 11B:
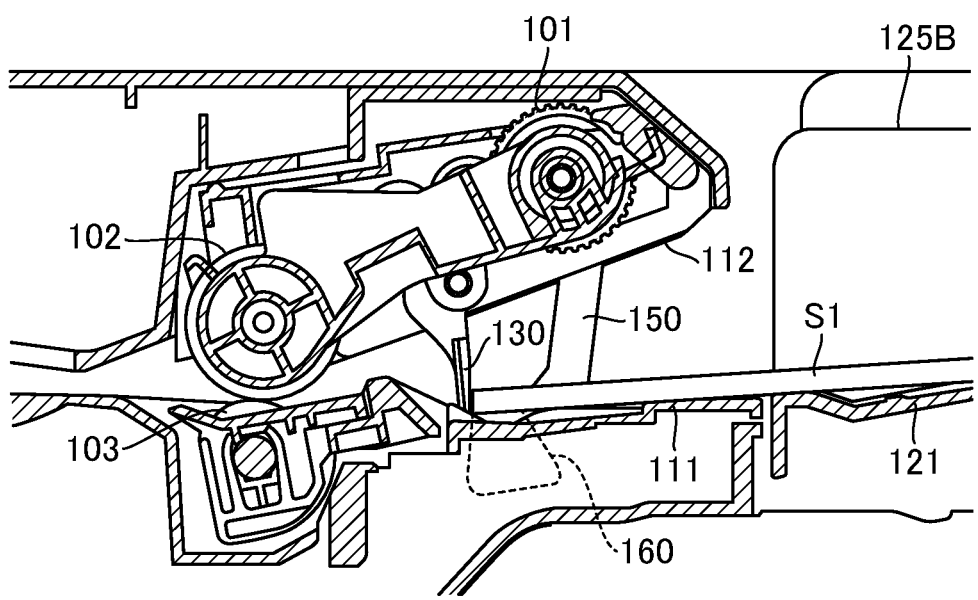
FIG. 11B is a section view illustrating the ADF of the second embodiment in a state in which the small-sized document is set.

Firstly, systems for detecting sizes of documents by the first document presence detection sensor Sn1 serving as a first detection sensor and the second document presence detection sensor Sn2 serving as a second detection sensor of the present embodiment will be described. FIG. 11A is a top view illustrating the ADF in a state in which a small-sized document is set. As illustrated in FIG. 11A, as the user places a small-sized document, i.e., a second size document, S1 having small widths such as a name card on the document tray 121, the side regulating plates 125A and 125B regulate widthwise positions of the document S1 by abutting with both widthwise ends of the document S1. Then, the document S1 is set within a widthwise first range W1. The detection member 160 of the first document presence detection sensor Sn1 is disposed at the detection position P1 which is a widthwise center part, i.e., at a position closer to the widthwise center more than widthwise ends. That is, the detection member 160 is disposed within the first range W1. Due to that, as the document S1 is inserted toward downstream in the feed direction and is set so as to abut with the regulating plate 130, the detection member 160 is pressed and pivots downward as illustrated in FIG. 11B. Thereby, the first document presence detection sensor Sn1 outputs an ON signal to the control portion 80, and the control portion 80 determines that the document S1 is present.

Figure 12:
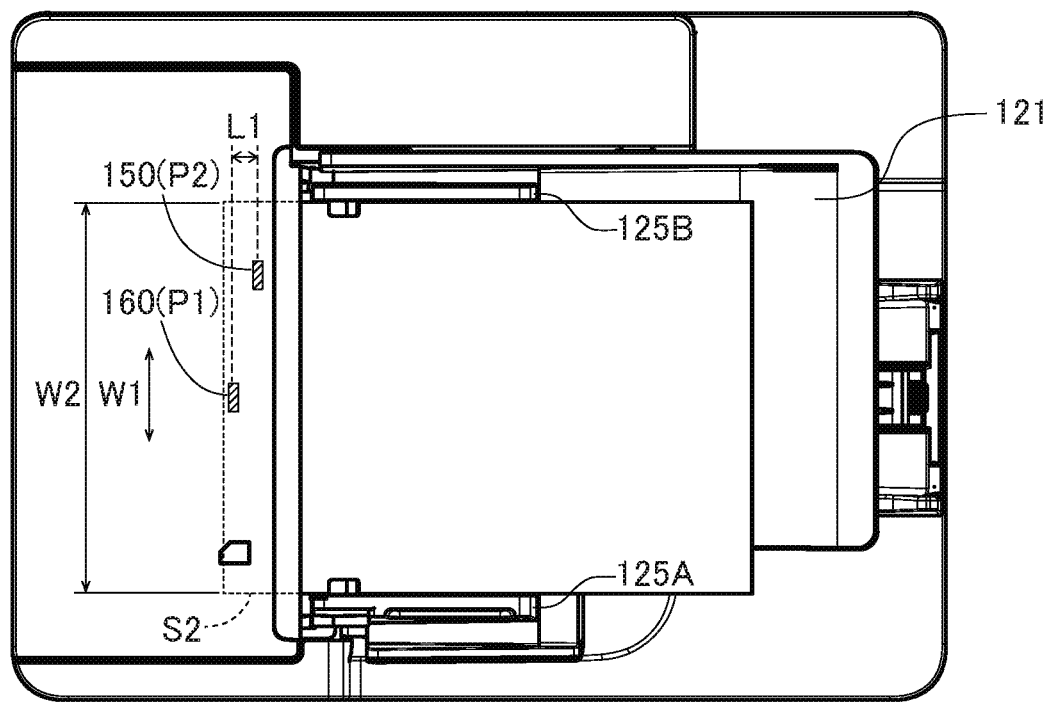
FIG. 12 is a top view illustrating the ADF of the second embodiment in a state in which a large-sized document is set.

Meanwhile, as the user places a large-sized document, i.e., a first size document, S2 having a large width such as a A4 size sheet on the document tray 121 as illustrated in FIG. 12, the side regulating plates 125A and 125B regulates widthwise positions of the document S2 by abutting with both widthwise ends of the document. Then, the document S2 is set within a widthwise second range W2. The detection member 160 of the first document presence detection sensor Sn1 is disposed at the detection position P1 located at the widthwise center part, i.e., the widthwise center side, as described above. The detection member 150 of the second document presence detection sensor Sn2 is disposed at the detection position P2 which is closer to the widthwise ends more than the widthwise center part and which is outside of the first range W1. That is, the detection member 150 is disposed outside of the first range W1 and inside of the second range W2. Therefore, as the document S2 is inserted toward downstream in the feed direction and is set so as to abut with the regulating plate 130 (see FIG. 5), the detection member 160 is pressed and pivots downward and the detection member 150 is pressed and pivots upward. Thereby, both of the first and document presence detection sensors Sn1 and Sn2 output ON signals to the control portion 80, and the control portion 80 determines that the document S2 is present.

Therefore, in a case where the first document presence detection sensor Sn1 outputs an ON signal and the second document presence detection sensor Sn2 outputs an OFF signal as illustrated in FIG. 11, the control portion 80 can determine that the document is a small-sized document. In a case where both of the first and second document presence detection sensors Sn1 and Sn2 output ON signals, the control portion 80 can determine that the document is a large-sized document. Note that a positional relationship in terms of the feed direction of the first and second document presence detection sensors Sn1 and Sn2 will be described later.

Document Feeding Process

Figure 14:
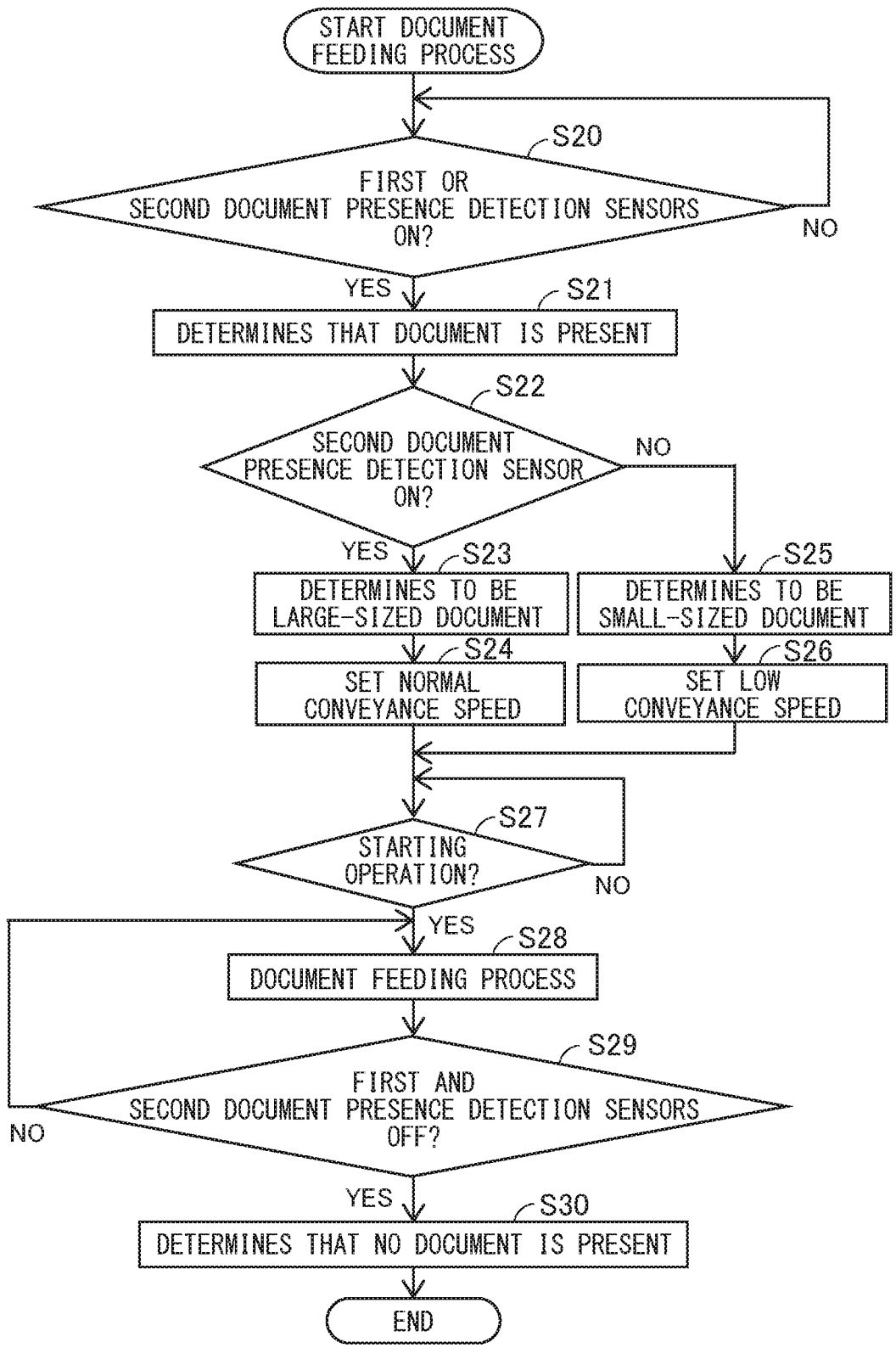
FIG. 14 is a flowchart illustrating a document feeding process of the second embodiment.

Next, a document feeding process executed by the control portion 80 will be described. As illustrated in FIG. 14, the first document presence detection sensor Sn1 is kept in a standby state while outputting an OFF signal until when the user sets a document on the document tray 121 for example, i.e., NO in Step S20. After that, as the user places a document on the document tray 121 and as the first document presence detection sensor Sn1 outputs an ON signal, i.e., YES in Step S20, the control portion 80 determines that the document is present in Step S21.

In succession, the control portion 80 determines whether the second document presence detection sensor Sn2 outputs an ON signal in Step S22. In a case where the second document presence detection sensor Sn2 outputs the ON signal, i.e., YES in Step S22, the process advances to Step S23. In a case where the second document presence detection sensor Sn2 outputs the OFF signal, i.e., No in Step S22, the process advances to Step S25. That is, in a case where the both of the first and second document presence detection sensor Sn1 and Sn2 output the ON signals, the control portion 80 determines that the document is a large-sized document S2 as illustrated in FIG. 12 in Step S23. Then, the control portion 80 sets the abovementioned first mode of setting a conveyance speed at a normal conveyance speed in Step S24.

Meanwhile, in a case where the first document presence detection sensor Sn1 outputs the ON signal and the second document presence detection sensor Sn2 outputs an OFF signal, the control portion 80 determines that the document is the document S1 as illustrated in FIG. 11A in Step S25. Then, because the document is highly possible to be a document having weak stiffness, the control portion 80 sets the abovementioned second mode by which the conveyance speed is set at a low conveyance speed which is slower than the normal conveyance speed in Step S26.

After that, the control portion 80 is kept in a state of waiting for receiving a start operation that instructs to start a reading operation through the operation key 92 of the operating portion 90, i.e., NO in Step S27. When the control portion 80 receives the start operation i.e., YES in Step S27, the control portion 80 executes the document feeding process of feeding the document to the image reading apparatus 30 at the conveyance speed set as described above in Step S28. Thereby, the image on the document is read, and the document is discharged to the discharge tray 122. In succession, the control portion 80 determines whether the first and second document presence detection sensors Sn1 and Sn2 output the OFF signal in Step S29, and if the first and second document presence detection sensors Sn1 and Sn2 do not output the OFF signals, i.e., NO in Step S29, the document is still present on the document tray 121, so that the control portion 80 executes the document feeding process of the next document in Step S28. Then, as the first and second document presence detection sensors Sn1 and Sn2 output the OFF signal, i.e., YES in Step S29 and there is no document on the document tray 121, the control portion 80 determines that no document is present in Step S30 and ends the document feeding process.

Positional Relationship Between First and Second Document Presence Detection Sensor Next, the positional relationship between the detection position P1 of the first document presence detection sensor Sn1 serving as the first detection sensor and the detection position P2 of the second document presence detection sensor Sn2 serving as the second detection sensor will be described. There is a case where the large-sized document S2 such as an A4 size sheet is placed aslant on the document tray 121 by the user or where an upper end portion of the document S2 in the drawing is folded or broken for example. Then, suppose that the detection position P1 of the first document presence detection sensor Sn1 and the detection position P2 of the second document presence detection sensor Sn2 are arrayed on a straight line in the width direction. In this case, there is a possibility that the first document presence detection sensor Sn1 outputs an ON signal and the second document presence detection sensor Sn2 outputs an OFF signal and the control portion 80 erroneously determines that the document is a small-sized document.

Figure 13:
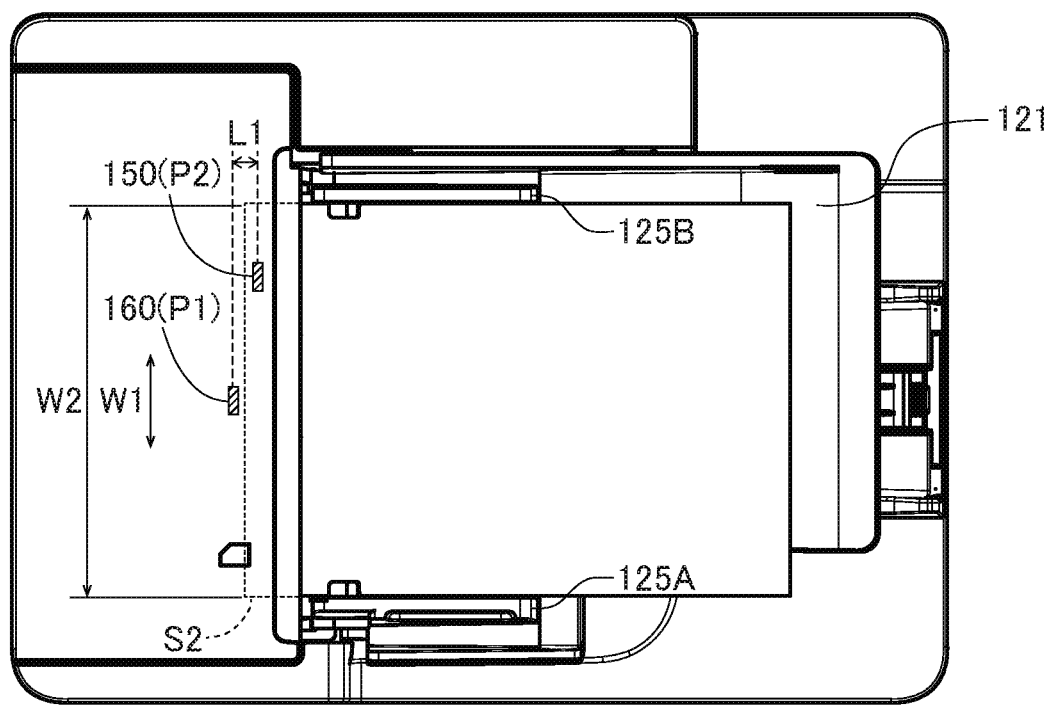
FIG. 13 is a top view illustrating the ADF of the second embodiment in a state in which the large-sized document is set in front of a regulating plate.

Then, the detection position P2 of the second document presence detection sensor Sn2 is disposed such that the detection position P2 is located upstream in terms of the feed direction by a distance L1 with respect to the detection position P1 of the first document presence detection sensor Sn1 in the present embodiment. By disposing the first and second document presence detection sensors Sn1 and Sn2 as described above, the second document presence detection sensor Sn2 outputs an ON signal even if the document S2 is set shallowly and is placed upstream in the feed direction before abutting with the regulating plate 130 for example as illustrated in FIG. 13. That is, the fact that the second document presence detection sensor Sn2 outputs the ON signal always means that the document is present on the document tray 121 and that it is a large-sized sheet. Accordingly, even if the document S2 is folded or is torn, the second document presence detection sensor Sn2 can readily detect the presence of the document more than the first document presence detection sensor Sn1, and it is possible to prevent the large-sized document S2 from being erroneously detected as a small-sized sheet.

As described above, according to the document reading apparatus 10 of the present embodiment, it is possible to determine the size of the document by disposing the first and second document presence detection sensors Sn1 and Sn2 in the apparatus body 110. This arrangement requires no wire to be routed within the document tray 121 and hence enables to reduce the costs. Still further, when a large-sized document S2 is set, this arrangement makes it possible for the second document presence detection sensor Sn2 to readily detect the presence of the document more than the first document presence detection sensor Sn1 and to prevent the large-sized document S2 from being erroneously detected as a small-sized sheet.

Note that even though the first document presence detection sensor Sn1 is the sensor for detecting the presence of the document on the document tray 121, it is utilized also as the sensor for detecting the sizes of the documents. That is, this arrangement requires no sensor dedicated for detecting sizes of documents and enables to reduce the costs.

Third Embodiment

Figure 15:
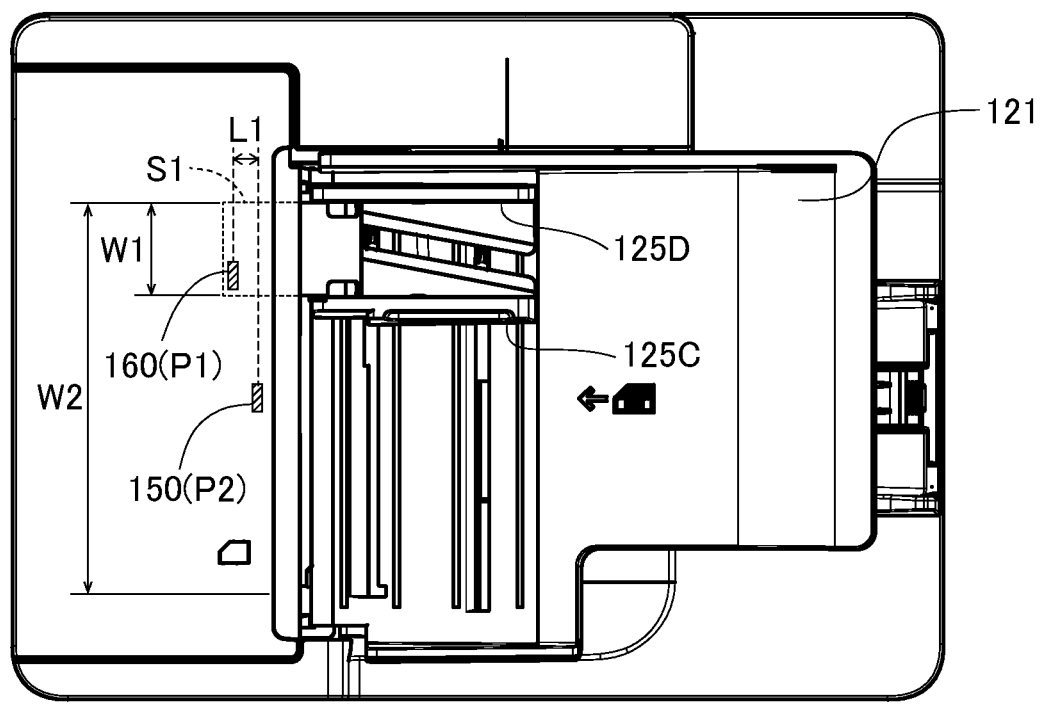
FIG. 15 is a top view illustrating an ADF of a third embodiment in a state in which a small-sized document is set.

Next, a third embodiment which is a partly modified embodiment of the second embodiment will be described with reference to FIG. 15. Note that in the following description of the third embodiment, component parts similar to those of the second embodiment will be denoted by the same reference numerals and descriptions thereof will be omitted here.

The configuration in which the side regulating plates 125A and 125B regulate the widthwise positions based on the widthwise center part such that documents having different widthwise sizes have a same conveyance center has been described in the first embodiment. In the third embodiment, one side regulating plate 125D is fixed as a fixed side regulating plate and another side regulating plate 125C is configured to be movable as a movable side regulating plate, i.e., as a so-called one-side moving width regulating member.

In such arrangement, the first range W1 in which a small-sized document S1 is positioned widthwise is set by utilizing a side of the fixed side regulating plate 125D as an end portion of the first range W1. Therefore, the detection member 160 of the first document presence detection sensor Sn1 is disposed widthwise on a side of the side regulating plate 125D, i.e., on outside of the widthwise center part, with respect to the second document presence detection sensor Sn2 so that the detection member 160 falls within the first range W1. The second range W2 in which a document not illustrated is positioned widthwise in a case where the large-sized document is set is set to be wider than the first range W1 by utilizing the side of the side regulating plate 125D as an end portion of the second range W2. Therefore, the detection member 150 of the second document presence detection sensor Sn2 is disposed at the widthwise center with respect to the first document presence detection sensor Sn1 such that the detection member 150 is located outside of the first range W1 and inside of the second range W2. It is noted that naturally various rollers such as the pickup roller 101 are disposed at positions corresponding to the first range W1 to be able to feed the small-sized document S1.

The detection member 150, i.e., the detection position P2, of the second document presence detection sensor Sn2 is disposed upstream in the feed direction by the distance L1 with respect to the detection member 160, i.e., the detection position P1, of the first document presence detection sensor Sn1 even in a case composed of the one-side moving width regulating member. This arrangement makes it possible for the second document presence detection sensor Sn2 to readily detect the presence of the document more than the first document presence detection sensor Sn1 when a large-sized document is set and to prevent the large-sized sheet from being erroneously detected as a small-sized sheet similarly to the first embodiment. Note that configurations, operations and effects of the third embodiment other than those described above are the same with those of the second embodiment, so that their descriptions will be omitted here.

Possible Other Embodiments

The configuration that detects sizes of documents set on the document tray 121 by the first and second document presence detection sensors Sn1 and Sn2 has been described in the embodiments described above. However, the configuration of the present disclosure is not limited to that and may be what detects sizes of documents set on a manual feed tray for example by two detection sensors that are configured to detect presence of the sheet.

The configuration in which the first and second document presence detection sensors Sn1 and Sn2 are disposed upstream in the conveyance direction of the regulating plate 130 and downstream in the conveyance direction of the pickup roller 101 has been described in the embodiments described above. However, the configuration of the present disclosure is not limited to that and may be disposed at any positions as long as the first and second document presence detection sensors Sn1 and Sn2 are disposed in the apparatus body 110 and the wires can be routed within the apparatus body 110. Specifically, both of the first and second document presence detection sensors Sn1 and Sn2 may be provided in the body unit 110B or in the cover unit 110A. Or, the first document presence detection sensor Sn1 may be provided in the cover unit 110A and the second document presence detection sensor Sn2 may be provided in the body unit 110B.

The configuration in which the side regulating plates 125A and 125B regulate the widthwise positions as the document is set has been described in the embodiments described above. However, the configuration of the present disclosure is not limited to that and concave groove portions corresponding to a small-sized sheet and a large-sized sheet may be provided in the document tray 121 for example to regulate widthwise positions of the sheet by the groove portions.

The configuration in which the large-sized, i.e., the first size, sheet is controlled at the normal conveyance speed, i.e., in the first mode, and the small-sized, i.e., the second size, sheet is controlled at the low conveyance speed, i.e., in the second mode, has been described in the embodiments described above. However, the configuration of the present disclosure is not limited to that and either one of the first and second conveyance speeds may be the normal conveyance speed as long as the conveyance speed of the large-sized sheet is the first conveyance speed and the conveyance speed of the small-sized sheet is the second conveyance speed different from the first conveyance speed. That is, the normal conveyance speed is intended to be a conveyance speed of a size of a document handled most and may mean a designed initial speed.

Still further, the configuration in which the control portion sets a different conveyance speed based on a determination of a document size has been described in the embodiment described above. However, the configuration of the present disclosure is not limited to that and may be what differentiates conveyance intervals between documents. In this case, in a case where the document is determined to be a small-sized document, i.e., a second size document, it is preferable to set conveyance intervals of the documents to be wider as compared to a case where the document is determined to be a large-sized document, i.e., a first size document.

Still further, while the configuration in which a conveyance control is made based on a determination of a document size has been described in the embodiment described above, a determination result of the document size may be displayed on the operating portion 90.

Still further, the configuration in which the first document presence detection sensor Sn1 is a document presence detection sensor that detects whether a document is present has been described in the embodiments described above, the configuration of the present disclosure is not limited to that and a document presence detecting sensor may be provided besides the first document presence detection sensor Sn1.

Still further, the configuration in which the first and second document presence detecting sensors Sn1 and Sn2 detect the presence of a document by pivoting the detection members has been described in the embodiment described above. However, the configuration of the present disclosure is not limited to that and may be what directly detects the presence of the document by a photo sensor for example. That is, any sensor may be used. Note that the present disclosure described in the embodiments described above may be combined in any manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-105234, filed Jun. 5, 2019, and Japanese Patent Application No. 2019-105236, filed Jun. 5, 2019 which are hereby incorporated by reference herein in their entirety.

What is claimed is:

1. A sheet conveyance apparatus comprising:
a body unit;
a sheet supporting tray pivotably supported with respect to the body unit and configured to support a sheet;
a feeding roller configured to feed the sheet placed on the sheet supporting tray;
a lower guide provided in the body unit and configured to guide a lower surface of the sheet fed by the feeding roller;
a cover unit pivotably supported with respect to the body unit and including an upper guide arranged opposite to the lower guide;
a first detection sensor provided in the body unit and configured to detect the sheet placed on the sheet supporting tray at a first detection position, the first detection sensor comprising a first detection member configured to rotate by being pushed by the sheet placed on the sheet supporting tray, and a first optical sensor configured to detect rotation of the first detection member; and
a second detection sensor provided in the cover unit and configured to detect the sheet placed on the sheet supporting tray at a second detection position farther from a center of the sheet supporting tray in a sheet width direction orthogonal to sheet conveyance direction than the first detection position, the second detection sensor comprising a second detection member configured to rotate by being pushed by the sheet placed on the sheet supporting tray, and a second optical sensor configured to detect rotation of the second detection member,
wherein the first detection member is arranged to protrude upward from the lower guide of the body unit, and
wherein the second detection member is arranged to hang downward from the upper guide of the cover unit.

2. The sheet conveyance apparatus according to claim 1, wherein the first and second detection positions are disposed downstream of the feeding roller in the sheet conveyance direction.

3. The sheet conveyance apparatus according to claim 1, further comprising a downstream regulating member configured to regulate a position of the sheet by abutting with a downstream end in the conveyance direction of the sheet placed on the sheet supporting tray, and
wherein the first and second detection positions of the first and second detection sensors are disposed upstream of the downstream regulating member in the conveyance direction.

4. The sheet conveyance apparatus according to claim 1, wherein the sheet supporting tray comprises a pair of side regulating plates disposed movably in the sheet width direction with respect to the sheet supporting tray and configured to regulate a position of the sheet by abutting with widthwise ends of the sheet placed on the sheet supporting tray, and
wherein the first detection position is disposed on a widthwise center side more than the second detection position.

5. The sheet conveyance apparatus according to claim 1, wherein the second detection position is disposed upstream in the sheet conveyance direction of the first detection position.

6. The sheet conveyance apparatus according to claim 1, wherein the sheet supporting tray comprises a fixed side regulating plate fixed to the sheet supporting tray and a movable side regulating plate disposed movably in the sheet width direction and configured to regulate a position of the sheet between the fixed side regulating plate by abutting with a widthwise end of the sheet placed on the sheet supporting tray and
wherein the first detection position is disposed on a side of the fixed side regulating plate in the width direction more than the second detection position.

7. A document reading apparatus comprising:
the sheet conveyance apparatus as set forth in claim 1; and
an image reading unit configured to read an image of a sheet conveyed from the sheet conveyance apparatus.

8. An image forming apparatus comprising:
a document reading apparatus as set forth in claim 7; and
an image forming unit configured to form an image read by the document reading apparatus onto another sheet.

9. The sheet conveyance apparatus according to claim 1, further comprising a control unit configured to control the sheet conveyance unit in a first mode in a case where the first and second detection sensors detect the sheet, and control the sheet conveyance unit in a second mode in which a sheet conveyance speed is slower than that of the first mode in a case where the first detection sensor detects the sheet and the second detection sensor detects no sheet.

10. The sheet conveyance apparatus according to claim 9, wherein the control unit determines the sheet is a first size in a case where the first and second detection sensors detect the sheet and determines the sheet is a second size smaller than the first size in a case where the first detection sensor detects the sheet is present and the second detection sensor detects no sheet.

11. A sheet conveyance apparatus comprising:
a body unit;
a sheet supporting tray pivotably supported with respect to the body unit and configured to support a sheet;
a feeding roller configured to feed the sheet placed on the sheet supporting tray;
a fixed side regulating plate fixed to the sheet supporting tray;
a movable side regulating plate disposed movably in a width direction and configured to regulate a position of the sheet between the fixed side regulating plate by abutting with a widthwise end of the sheet placed on the sheet supporting tray;
a lower guide provided in the body unit and configured to guide a lower surface of the sheet fed by the feeding roller;

a cover unit pivotably supported with respect to the body unit and including an upper guide arranged opposite to the lower guide;

a first detection sensor provided in the body unit and configured to detect the sheet placed on the sheet supporting tray at a first detection position, the first detection sensor comprising a first detection member configured to rotate by being pushed by the sheet placed on the sheet supporting tray, and a first optical sensor configured to detect rotation of the first detection member; and a second detection sensor provided in the cover unit and configured to detect the sheet placed on the sheet supporting tray at a second detection position farther from the fixed side regulating plate in a sheet width direction orthogonal to a sheet conveyance direction than the first detection position, the second detection sensor comprising a second detection member configured to rotate by being pushed by the sheet placed on the sheet supporting tray, and a second optical sensor configured to detect rotation of the second detection member, wherein the first detection member is arranged to protrude upward from the lower guide of the body unit, and wherein the second detection member is arranged to hang downward from the upper guide of the cover unit.

* * * * *